United States Patent Office 3,408,725
Patented Nov. 5, 1968

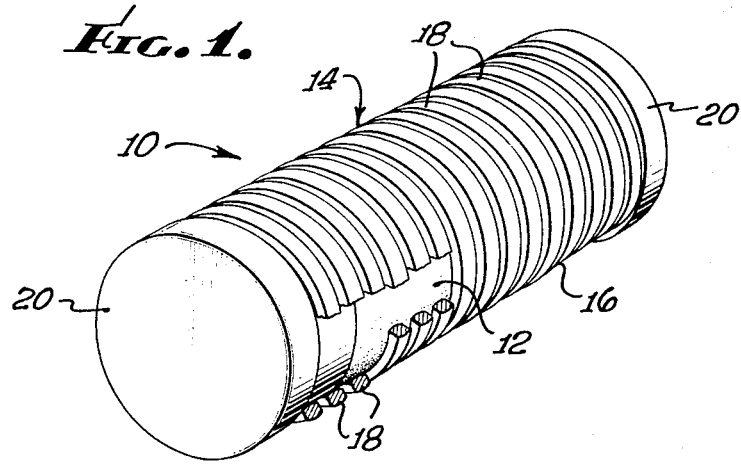
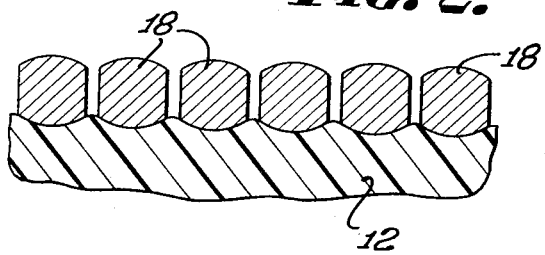
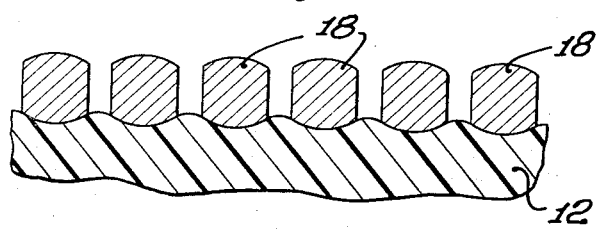
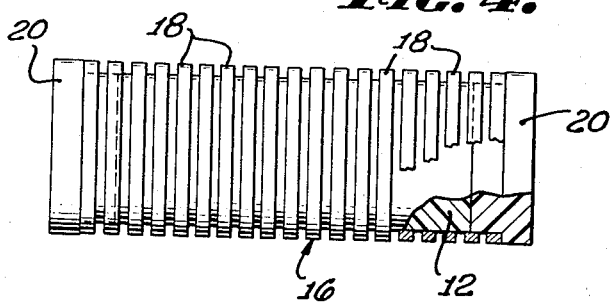

3,408,725
HEAT MOTOR
Richard D. Grayson, Arcadia, Calif., assignor to International Telephone and Telegraph Corporation, New York, N.Y., a corporation of Maryland
Filed May 24, 1966, Ser. No. 552,572
1 Claim. (Cl. 29—447)

ABSTRACT OF THE DISCLOSURE

A heat responsive actuator comprising a cylindrical body of resilient material having a high coefficient of expansion confined in an enclosure formed of a plurality of radially rigid annular elements of a material having a significantly lower coefficient of expansion so that volumetric expansion of the body is axially directed into a linear output. Caps cover the ends of the heat responsive body for transmitting the axial movement of the body.

---

This invention relates to an improved motor or actuator of the type incorporating a body of resilient material having a high coefficient of expansion to serve as a heat responsive mass for producing a force output.

Motors or actuators employing a heat responsive fluid as a force producing medium such as bulb and bellows arrangements have been widely employed in a variety of control functions such as opening or closing valves or dampers. One disadvantage of such devices is that the fluid must be well sealed to provide reliable operation. Solid but resilient materials such as rubber have also been employed as the heat responsive medium in that they have expansion rates, rivaling those of fluids and will move like a fluid when under pressure in confined spaces. Such material, however, does not require a seal and hence potentially provides an attractive advantage over fluid.

In perhaps the most conventional approach for an actuator using a resilient material as the expansion medium, a body of the material is tightly confined in a cylinder having one fixed end and an axially movable piston closing the other end. The volumetric expansion of the material is thus directed as a linear force reacting against the piston. In order to assure positive repeatable movement of the piston, the resilient material must be kept under considerable pressure by the load. This poses a problem in that such pressures tend to cause particles of the material to be progressively nibbled away from the material and worked into the space between the piston and the cylinder. The resulting loss in material volume naturally adversely affects the repeatable accuracy of the device. Also, the wedged particles cause high friction between the piston and the cylinder.

It is a primary object of this invention to provide a unique, low-cost actuator of the above described type which overcomes the aforementioned problem to produce positive and repeatable linear force output.

It is a further object of this invention to provide an actuator utilizing a heat responsive resilient material with a casing which confines and directs the volumetric expansion of the material to produce a linear output with a minimum of relative movement between the casing and the material causing undesirable friction.

It is another object of this invention to provide a unique method for fabricating the above described heat responsive actuator.

In accordance with this invention, a body of thermally responsive resilient material is tightly confined within a casing having side walls which are radially rigid, but axially expandible. Since the resilient material has a coefficient of expansion greater than that of the casing material, the volumetric expansion of the material is directed by the casing side walls into a linear output. In one form of the invention, the side walls are formed by a plurality of axially aligned annular elements positioned closely adjacent to each other. As the resilient material expands linearly, the annular elements axially separate from each other with the result that the frictional relative movement between the material and the individual annular elements is minimized, but yet the material does not extrude between adjacent elements.

In accordance with the method of the invention, the annular elements forming the actuator casing side walls may be positioned in axial contact with each other. A cylindrical body of the resilient thermally responsive material is formed with an outside diameter slightly larger than the inside diameter of the annular elements so that an interference fit between the casing and the resilient material may be attained. By cooling the cylinder of resilient material to a reduced temperature, it may be inserted into the annular elements and then returned to operating temperatures so that the material is tightly confined within the annular elements. As the resilient material warms and expands, the annular elements become uniformly slightly spaced to facilitate accurate calibration of the completed actuator.

Further features, objects and advantages will become apparent with reference to the following detailed description and drawing in which:

FIG. 1 is a perspective view of a heat responsive actuator incorporating the teachings of the invention;

FIG. 2 is an enlarged cross-sectional view of a portion of the actuator of FIG. 1 when the actuator is at the low temperature of its operating range;

FIG. 3 is a view of the structure of FIG. 2 after it has been heated to a higher temperature; and FIG. 4 is a modification of the actuator of FIG. 1.

Referring now to the drawings, the actuator 10 of the invention may be seen to include a generally cylindrical body 12 of resilient material having a high coefficient of expansion tightly confined in a tubular or cylindrical casing 14 having a lower coefficient of expansion. In addition to being highly heat responsive, the material should be generally solid, but adapted to be forced into confined spaces under pressure somewhat like a fluid. Various elastomers or rubber like materials have such properties with silicon rubber being particularly well suited.

The tubular casing side walls 16 are adapted to be radially rigid, but axially expandible and are preferably uniquely formed by a plurality of annular elements 18. Such annular elements may be continuous by being connected to form a coil spring as shown in FIG. 1 or may be discrete elements such as washers or the like, as shown in FIG. 4.

The ends of casing 14 are closed by a pair of end plugs 20 which are securely attached to the side walls 16 in some suitable manner. In this fashion, the body 12 of resilient material is tightly confined within casing 14.

At the lower end of the temperature range in which the actuator is to operate, the annular elements 18 are positioned closely adjacent to each other as shown in FIG. 2. Functionally, adjacent elements may be in contact at the lower end of the temperature range, but for calibration purposes, it is desirable that adjacent elements be slightly spaced at that temperature.

As the temperature of the actuator is raised, the body 12 expands volumetrically at a rate greater than that of the casing 14, and since the side walls 16 are relatively rigid, the expanded material 12 is forced to move axially providing a linear force output which may be transmitted through end caps 20 to perform whatever ultimate function desired. The axial expanson of the body 12 causes adjacent annular elements 18 of side walls 16 to become axially spaced a small amount as indicated in FIG. 3. The spacing between adjacent elements is such that the material 12 is not extruded radially outwardly between the elements.

As mentioned above, when a body of thermally responsive resilient material is confined within a rigid cylinder with a piston on one end receiving the axial output force of the actuator, small particles of the material become nibbled or worn away from the main body and wedged between the cylinder and the piston. The loss of material volume naturally affects the repeatability of the actuator movement and the wedged particles introduce undesirable friction between the piston and the cylinder.

With the axially expandible casing of the invention, this undesirable action is minimized if not altogether eliminated. The cause of the difficulty in the prior art arrangement is believed to be the relative movement between the resilient material and the adjacent casing, plus the existence of the small space between the piston and casing. With the prior art actuator, the portion of the resilient material adjacent the piston is subjected to essentially the entire relative axial movement between the material and the casing. With the expandible casing of this invention, the annular elements of the casing walls separate so that the relative movement between the casing side walls 16 and the material 12 is distributed throughout the length of the actuator. Plus, much of the expansion actually occurs between adjacent elements. Consequently, any given annular element has very limited relative movement with the material 12. The annular elements 18 in effect, move with the expanding material. Also, there is no space between the ends 20 of the actuator and the casing side walls 16 in which material can be wedged as in the prior art construction mentioned above.

Since the actuator body 12 is under pressure there is, of course, a force urging the resilient material outwardly between adjacent elements as the casing 14 axially expands. However, it has been found that there is no significant extruding action if the spaces are kept small and that the actuator provides accurate, repeatable performance.

Theoretically, it is believed that the frictional forces between the body 12 and the side walls 16 can be more effectively minimized by making the annular elements 18 very thin in the axial dimension since there is then less relative movement between the casing and the resilient material. The axial dimension selected for the annular element must, of course, be balanced with the practical factors of cost, manufacture and assembly.

It has been found that with axial spacing between adjacent elements of .003 to .004 of an inch, no significant radial extrusion between elements occurs when using silicon rubber under pressure of say 100 pounds of force.

The maximum axial movement for a given actuator is thus limited by the spacing between elements. If the spacing between elements is approximately .0005 inch when at the low end of a working range, say 50° F., and .003 inch at the high end of a range, say 300° F., each element can be moved approximately .0025 inch or about .001 inch per 100° F. Thus, with an actuator about an inch long containing about 30 annular elements approximately .030 inch thick, the total stack, moving at .0003 inch per degree, will vary its length about .075 inch through the total 250° range.

To facilitate calibration of the actuator movement, it is desirable that the elements 18 be slightly spaced when the actuator is calibrated at the low end of an operating range. It is also desirable, although not essential, that the spacing between elements be uniform throughout the length of the device to attain maximum utilization without extrusion.

In accordance with the method of the invention, this result may be obtained by cooling the resilient body to a reduced temperature below the operating range and inserting the body into the casing side walls with the adjacent annular elements in contact with each other. As the body 12 is allowed to return to operating temperature, the material expands in all directions initially until it is tightly confined by the side walls 16. Further expansion is directed axially causing the annular elements to become approximately equally spaced. The amount of spacing may be controlled by considering the expansion rate of the material and by adjusting the reduced temperature level.

The body 12 may also be molded in place within the casing 14 or simply forced into position, however, calibration problems may be more difficult.

It is contemplated that the body 12 will be secured axially by individual elements 18 merely by friction. However, if necessary, a suitable adhesive may be employed, or appropriate interengaging surfaces in the expansion material and in the casing may be provided.

In certain control operations, it may be desirable to electrically heat the body 12 to cause actuation of a device. For this purpose, electrically conductive material may be employed for the expansive material to directly resistively heat the actuator.

In addition to the described casing side wall having annular elements, other structures which are axially expandible but radially rigid may be employed. For example, tubular cables having braided side walls which are commonly employed for electrical wiring applications such as in shielded cable may be suitable for certain applications. Such cable is axially expandible and although the diameter of the cable changes slightly as the length changes, the side walls are still relatively rigid to radially confine a resilient body under pressure.

In view of the foregoing description, various changes and modifications may become apparent, and it is intended that all such changes and modifications within the true spirit and scope of the invention be included in the appended claim.

What is claimed is:

1. A method of fabricating a heat responsive actuator comprising:
    forming a generally cylindrical body of thermally responsive, resilient material,
    forming a general tubular casing of a plurality of axially aligned radially rigid annular elements, said casing having an inside diameter which is slightly smaller than the outside diameter of said body at an operative temperature for the actuator and said casing having a coefficient of expansion less than that of said body, cooling said body to a reduced temperature wherein said body has an outside diameter less than the inside diameter of said casing, placing adjacent annular elements of said casing in axial contact, inserting said body into said casing at said reduced temperature and allowing said body to return to said operating temperature thereby producing an interference fit between said body and said casing.

References Cited
UNITED STATES PATENTS

| | | | |
|---|---|---|---|
| 1,936,389 | 11/1933 | Hallquist | 267—33 XR |
| 1,938,995 | 12/1933 | Beynon. | |
| 2,800,320 | 7/1957 | Jarret et al. | 267—63 XR |
| 2,800,321 | 7/1957 | Jarret et al. | 267—63 |
| 3,075,348 | 1/1963 | Baker | 60—23 |

MARTIN P. SCHWADRON, *Primary Examiner.*

C. B. DORITY, *Assistant Examiner.*